Jan. 25, 1966  A. ROSSAK  3,231,158
APPARATUS FOR THE MANUFACTURE OF KNITTED GOODS
Filed March 21, 1962  17 Sheets-Sheet 1

*Inventor:*
ALFRED ROSSAK

*Mestern, Ross & Mestern*

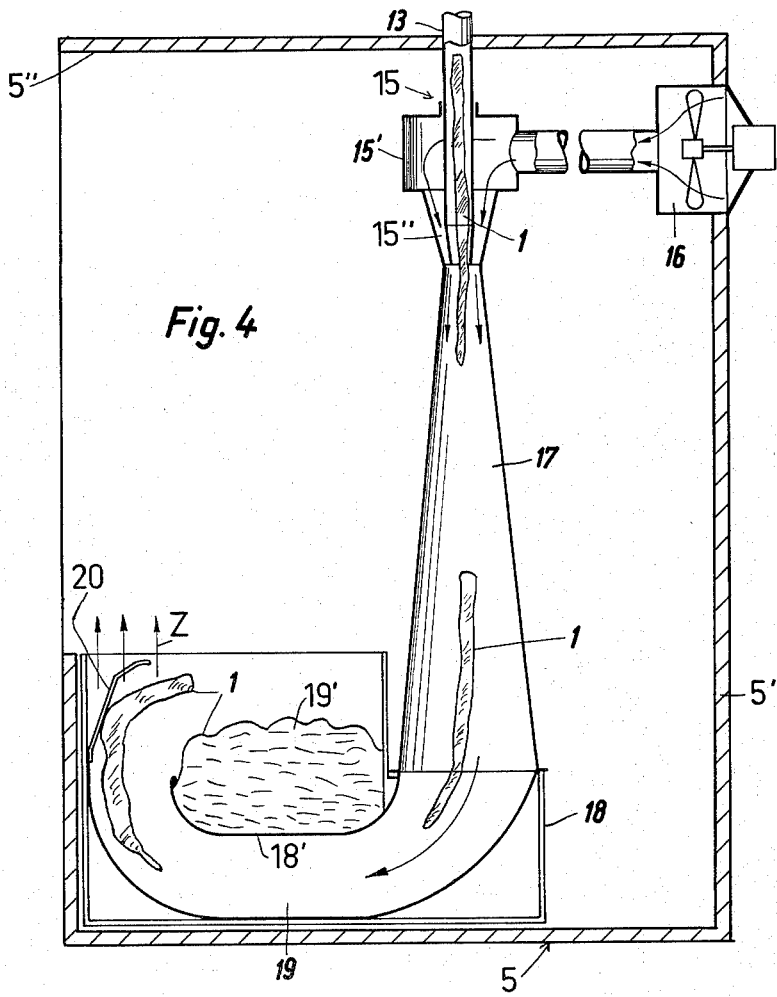

Jan. 25, 1966  A. ROSSAK  3,231,158
APPARATUS FOR THE MANUFACTURE OF KNITTED GOODS
Filed March 21, 1962  17 Sheets-Sheet 4
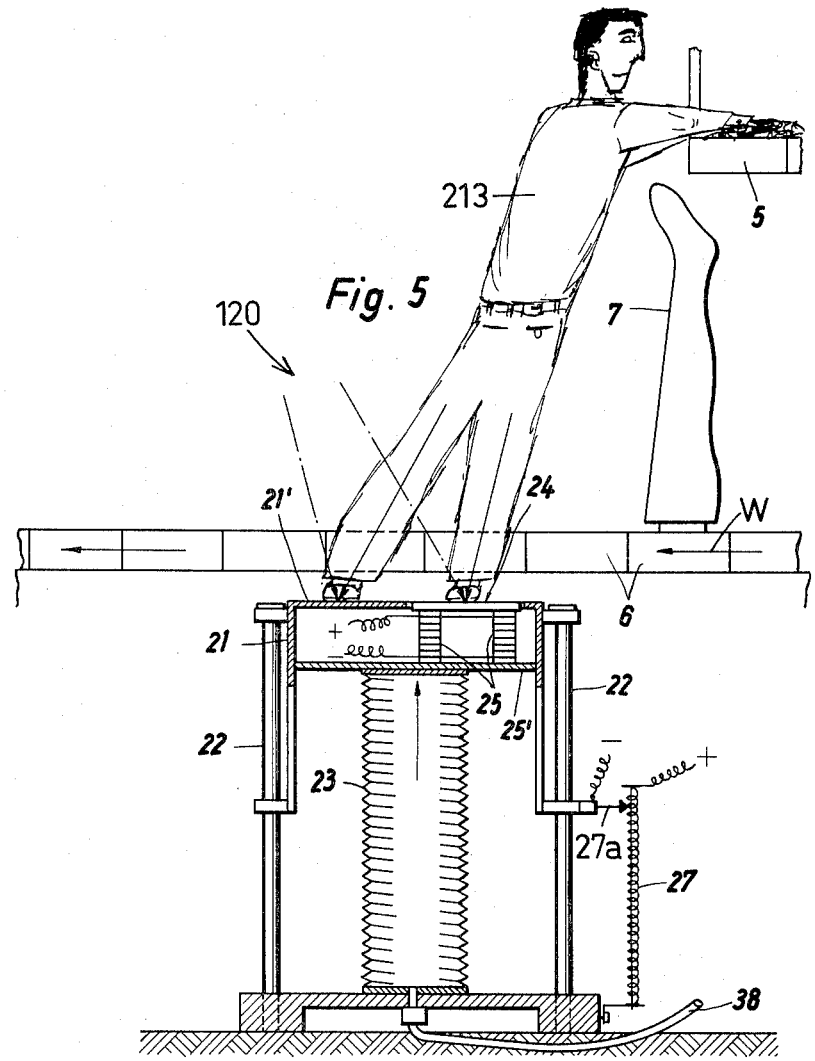
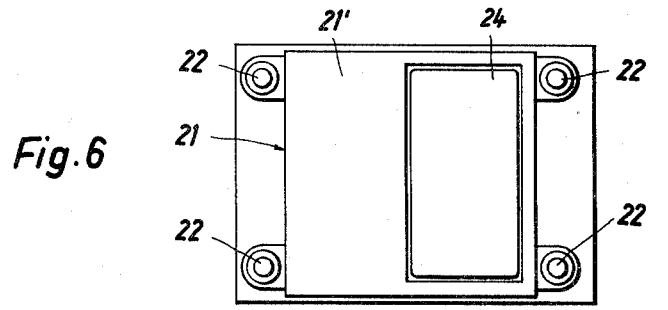
Inventor:
ALFRED ROSSAK
Mestern, Ross & Mestern Jan. 25, 1966   A. ROSSAK   3,231,158
APPARATUS FOR THE MANUFACTURE OF KNITTED GOODS
Filed March 21, 1962   17 Sheets-Sheet 5

Inventor:
ALFRED ROSSAK
Mestern, Ross & Mestern

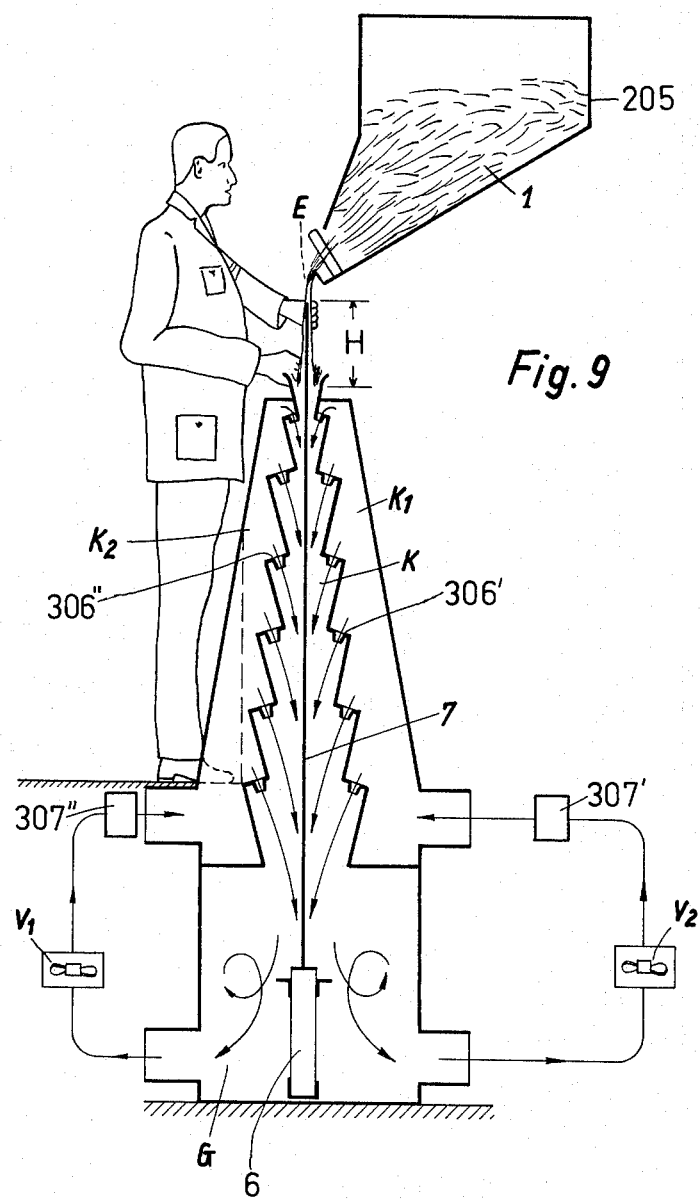

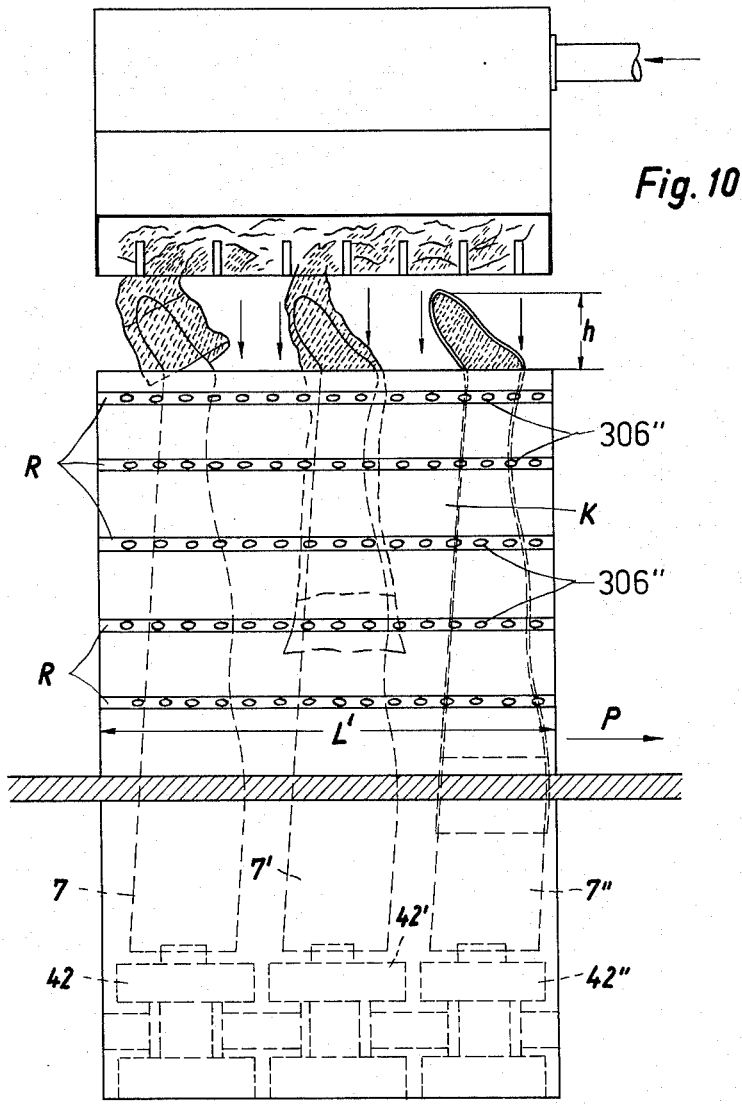

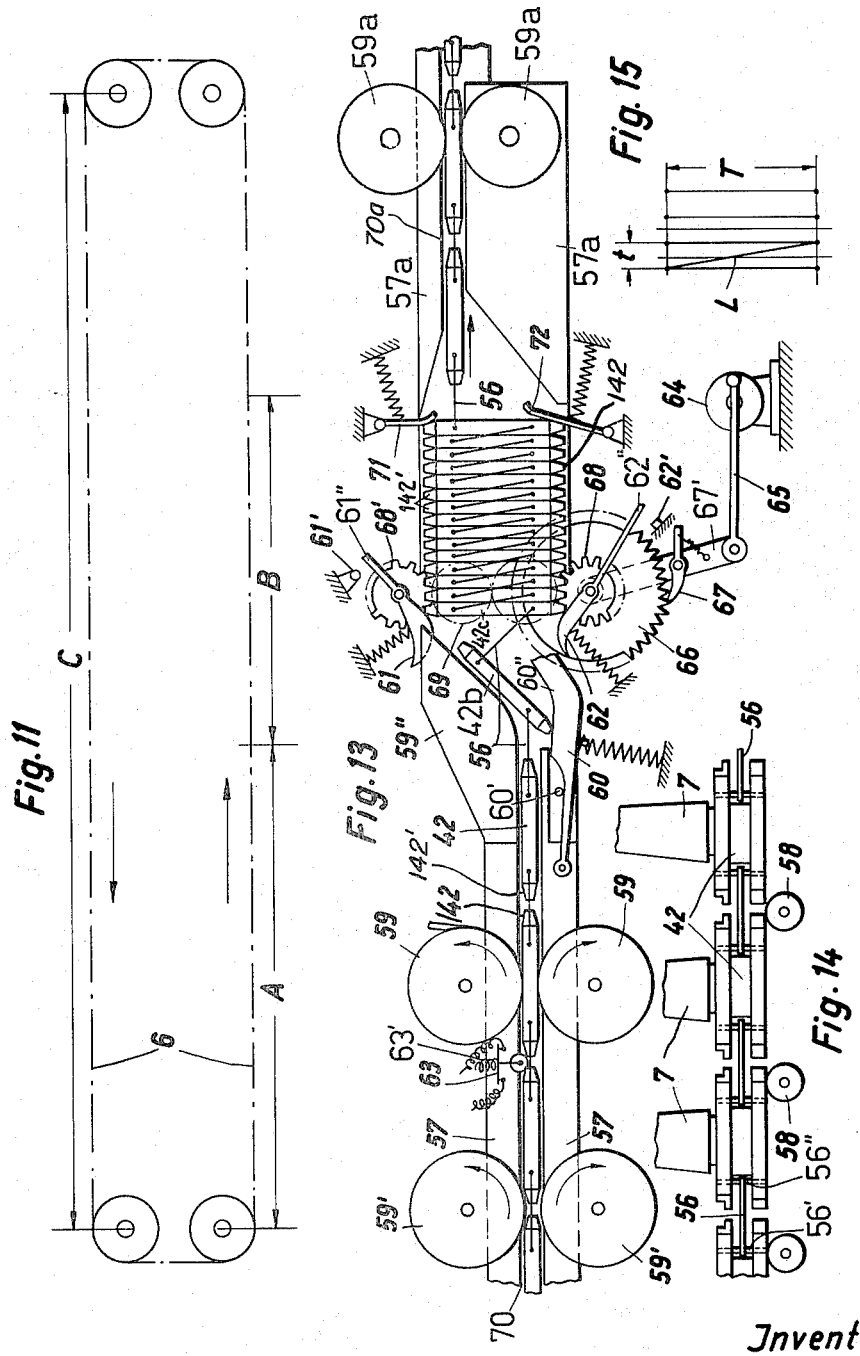

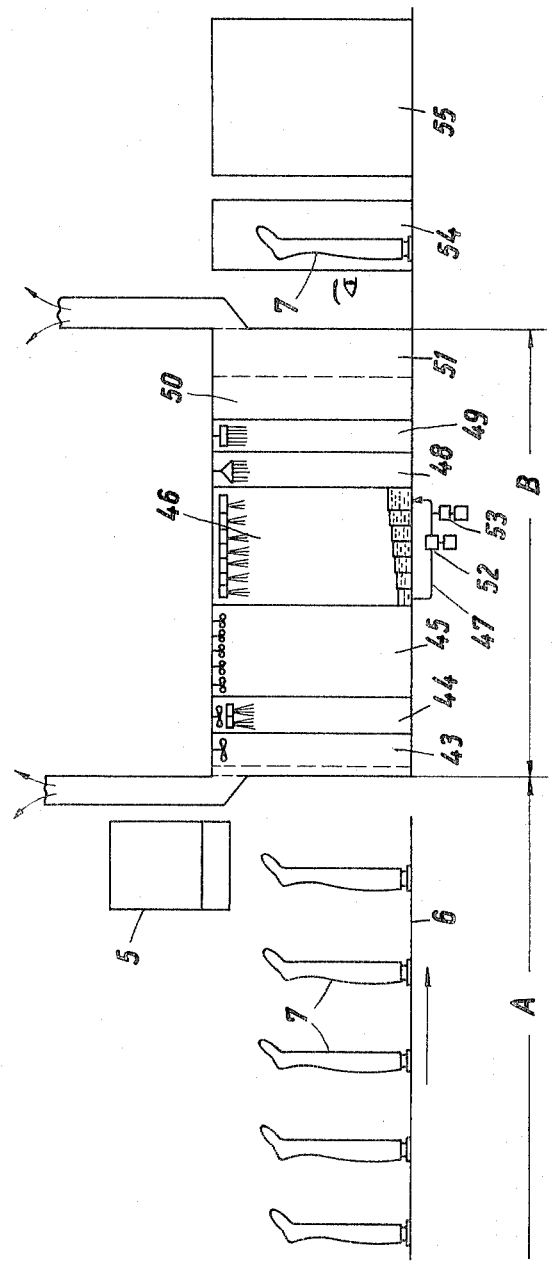

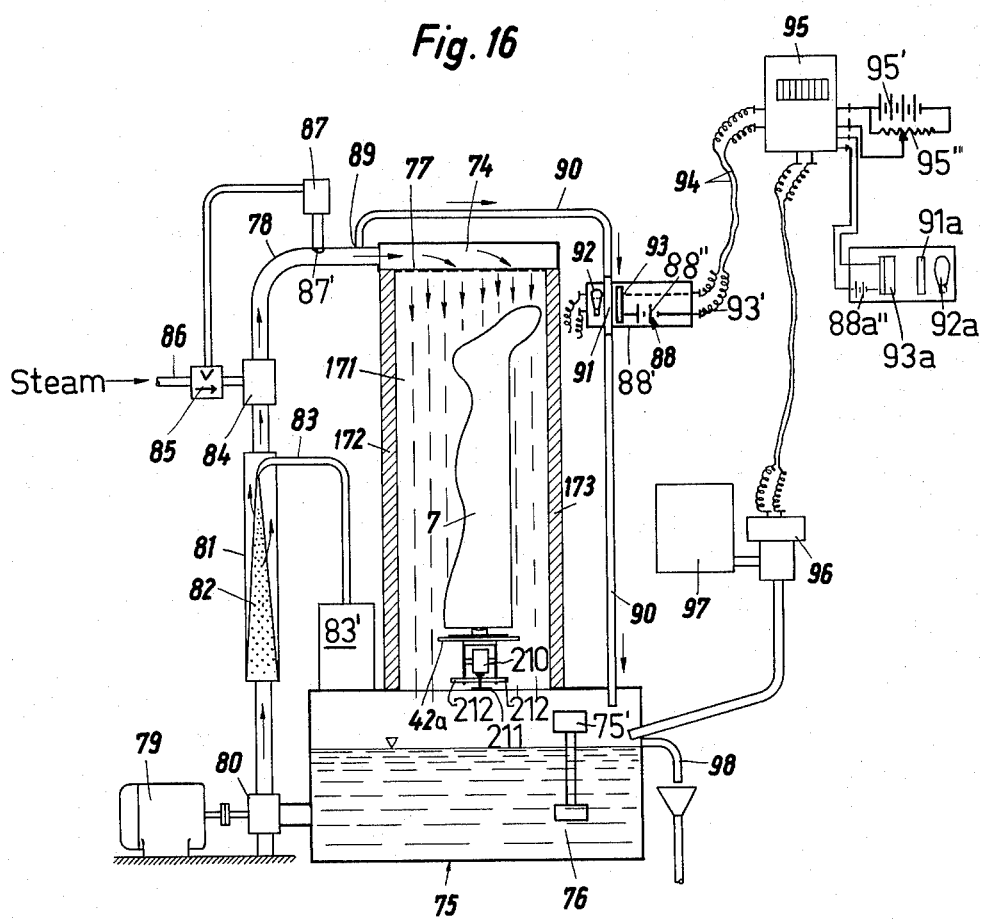

Inventor:
ALFRED ROSSAK

*Inventor:*
ALFRED ROSSAK

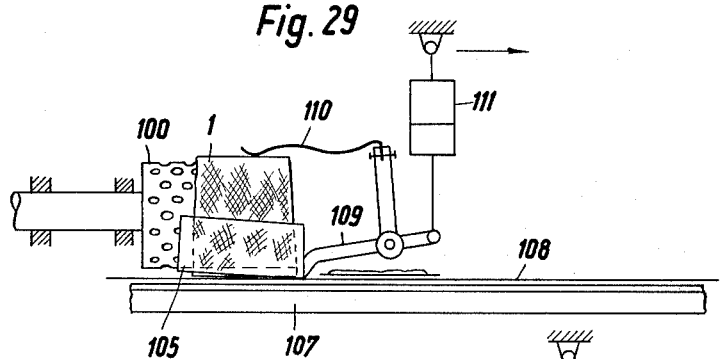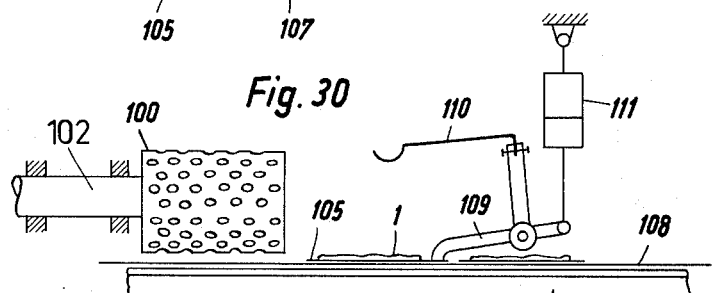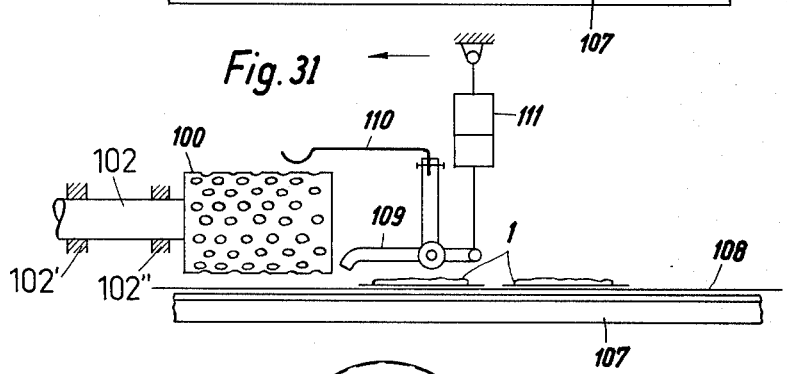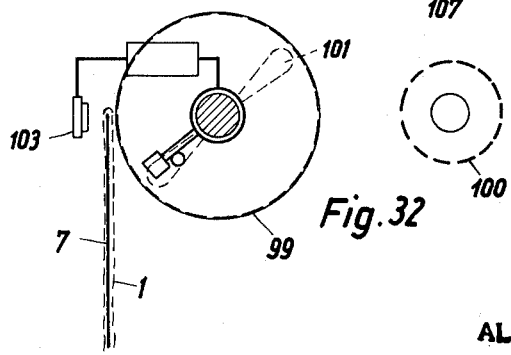
Inventor:
ALFRED ROSSAK

Jan. 25, 1966  A. ROSSAK  3,231,158
APPARATUS FOR THE MANUFACTURE OF KNITTED GOODS
Filed March 21, 1962  17 Sheets-Sheet 15
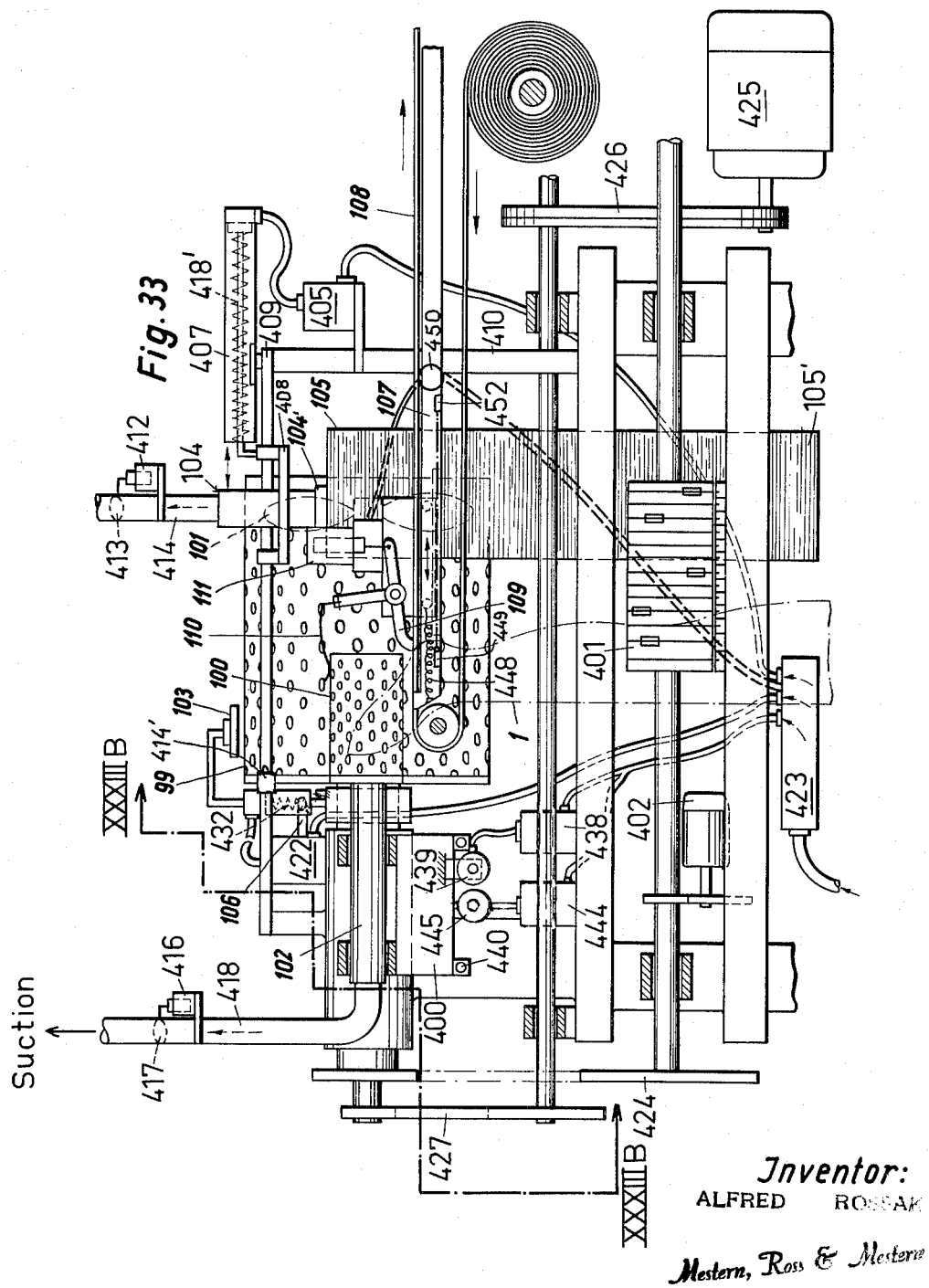
Inventor:
ALFRED ROSSAK
Mestern, Ross & Mestern Jan. 25, 1966  A. ROSSAK  3,231,158
APPARATUS FOR THE MANUFACTURE OF KNITTED GOODS
Filed March 21, 1962  17 Sheets-Sheet 17

Inventor:
ALFRED ROSSAK

Mestern, Ross & Mestern

United States Patent Office 3,231,158
Patented Jan. 25, 1966

3,231,158
APPARATUS FOR THE MANUFACTURE OF KNITTED GOODS
Alfred Rossak, Unterrot, Germany, assignor to Arwa Holding S.A., Chur, Graubunden, Switzerland, a corporation of Switzerland
Filed Mar. 21, 1962, Ser. No. 181,346
Claims priority, application Germany, Mar. 27, 1961, A 37,062; June 1, 1961, A 37,570; June 16, 1961, A 37,672; Dec. 28, 1961, A 39,118; Jan. 17, 1962, A 39,229; Jan. 19, 1962, A 39,240
10 Claims. (Cl. 223—76)

The present invention relates to apparatus for producing knitted goods and, more particularly, to a plant for producing hosiery and other textile articles which are required to pass through a plurality of processing steps. In my copending application Ser. No. 140,128, filed September 22, 1961, I disclosed an apparatus and process for manufacturing, treating and sorting hosiery and like articles in a mass-production system. The present invention provides improved and accelerated processing of such articles with all processing steps correlated into a unitary system affording a continuous flow of the articles therethrough.

It is, therefore, an object of the present invention to provide a continuous-flow system for producing knitted articles such as nylon, rayon, or like hosiery.

A further object of the invention resides in the provision of improved means, in a continuous-flow system, for displacing flexible textile articles between processing stations, for treating them while maintaining their shape nad for wrapping the articles.

Another object of the invention is to provide means for operating a succession of treatment stations continuously, in spite of the fact that one or more of the stages may require prolonged treatment periods.

According to one aspect of my invention, textile articles are produced and passed continuously through a plurality of sequential stations in a manner such that the number of articles passed through each stage corresponds substantially to the rate at which articles are processed throughout the system. Thus, no one stage of the process will impede the progress of the articles therethrough. The sequentially arranged stages advantageously include a knitting station, wherein a plurality of knitting machines produce the tubular articles and feed them to a mounting station wherein they are put on suitable forms. From the later station they are passed through the various treatment stages, which may include a dyeing stage, a plasticization or plastification stage, and an inspection stage. At a dismounting station the articles are removed from the forms, sorted and wrapped.

According to a more particular feature of the invention, each form constitutes a link in a continuous chain; each form passes through the treatment stages from the mounting station to the dismounting station and then returns from the latter to the mounting station preparatorily to receive a new article.

While the present invention also contemplates the intervention of the human operator at one or more locations along the continuous production line, I provide means for accelerating the action of the operator to avoid slowdown of the process. Thus, another aspect of the present invention resides in the provision of means for automatically or semiautomatically drawing the roughly formed stockings onto their forms and for removing them therefrom. In mounting the stockings on the forms, I prefer to employ pneumatic jets to entrain the stockings downwardly onto the upright forms. Since the latter may have a height of as much as one meter, I have found that manual positioning of the stockings on the forms can be accelerated by providing the operator with a vertically displaceable platform which lowers as the operator progressively draws a stocking over a form. Advantageously, the platform is controlled automatically by the shifting of the weight of the operator, who moves his body in pace with the continuously moving form. The latter need not, therefore, remain stationary while the stocking is pulled on, as required heretofore.

According to another feature of the invention I provide pneumatic conveyor means for transporting the article between the knitting machines and the mounting station. As disclosed in my above-mentioned copending application the pneumatic conveyor means may be provided with one or more gates through which the articles issue. Advantageously the conveyor means of the present invention comprises a conduit whose outlet is provided with a Venturi injector adapted to draw the articles through the conveying conduit and a diffuser forwardly of the injector whereby the velocity of the air stream conveying the articles is reduced to slow the travel of the latter.

Yet another feature of the invention resides in the provision of a dyeing stage in the processing station whereby a dye-containing liquid is sprayed onto articles carried by the forms and is continuously circulated. Photoelectric sensing means are provided for detecting the concentration of dye in the liquid. The sensing means advantageously include an electrical comparometer whereby the output of the colorometric detector, which may be a photocell or the like, is compared with an electrical parameter representative of the predetermined dye level so as to operate a valve or the like for introducing dye concentrate into the liquid upon the concentration of dye therein falling below a predetermined level. The electrical comparometer may be a bridge circuit of known type which receives its reference voltage from the colorometric evaluation of a standard sample or an independent source of potential. The dye-liquid circulating system is also preferably provided with temperature-control means and filter means for maintaining the purity and dyeing efficiency of the liquid.

At the dismounting and wrapping stations I provide a drum substantially tangent to the planes of the forms displaced along their closed transport path and rotatable about a generally horizontal axis parallel to these planes and the path. A pneumatically operated radially displaceable gripper element is disposed on the opposite side of the path and, upon displacement toward the drum, clamps an article against it so that upward rotation of the drum draws the article off the form. The drum is preferably perforated and provided within its hollow interior with a suction-creating fan which draws the stocking stripped from the form against the drum. The stocking is then disposed upon a flexible sheet carried by a further drum and conveyed from the latter to a flexible band which constitutes the wrapping material. The entire operation of the dismounting and wrapping sequence is preferably controlled by a central sequence programmer.

The above and other objects, features and advantages of the present invention will become more readily apparent from the following description, reference being made to the accompanying drawing in which:

FIG. 4 is an axial cross-sectional view of a discharge mechanism at the outlet end of a pneumatic conduit portion having the pneumatic gate of FIGS. 2 and 3 at the inlet end thereof;

FIG. 5 is an elevational view, partly in section, of a mounting station of the plant wherein stockings are drawn onto respective forms, showing the operator platform;

FIG. 6 is a plan view of the platform;

FIG. 9 is a diagrammatic cross-sectional view showing means facilitating the drawing of the stockings onto the form;

FIG. 10 is an elevational view of the apparatus shown in FIG. 9;

FIG. 11 is a plan view schematically illustrating the continuous form chain;

FIG. 12 is an elevational view, partly in cross-section, diagrammatically representing a plurality of treatment stages of a processing station positioned along the chain;

FIG. 13 is a plan view of the chain, partly broken away, showing means for preparing the forms for passage through these stages;

FIG. 14 is an elevational view of the form chain;

FIG. 15 is a diagrammatical representation of the dimensioning of the latter;

FIG. 16 is a cross-sectional view, taken transversely to the chain, diagrammatically illustrating the dyeing stage;

FIGS. 28–31 are views similar to FIG. 17 of a portion of the wrapping means in successive operative positions;

FIG. 32 is a view similar to FIG. 18 showing the dismounting means again in their initial position;

FIG. 33 is a front-elevational view, partly broken away, showing somewhat diagrammatically the dismounting and wrapping assembly;

*I. General description of plant (FIGS. 1 and 35)*

Figure 35:
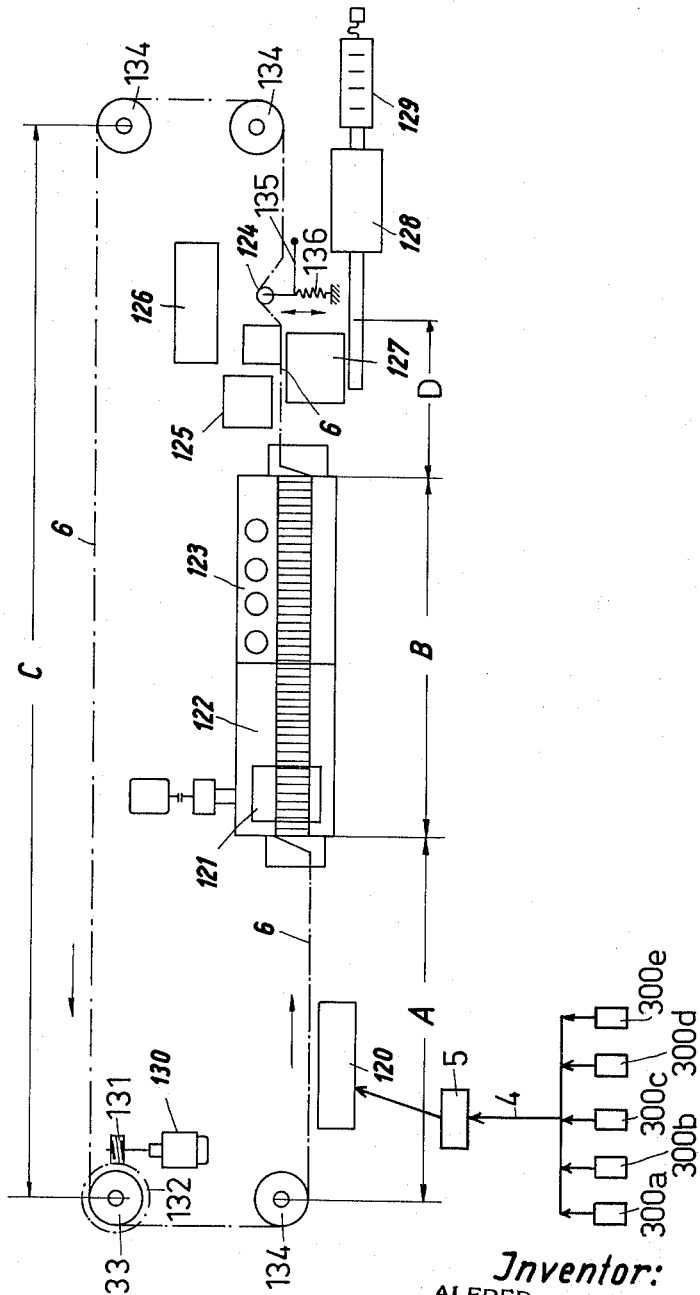
FIG. 35 is an overall diagram of the plant.

In FIG. 35 I show a hosiery plant wherein a plurality of knitting machines 300a–300e feed finished or semi-finished tubular hose into a common feed line 4 whence they may be carried to a classification station 5. The latter feeds a mounting station 120 along the path of a chain 6 of forms 7 (see FIG. 1). The chain, which will be described in greater detail hereinafter, is driven by a motor 130 whose worm 131 meshes with a worm gear 132 of a roller 133 about which the chain 6 passes. The chain also passes around rollers 134 in a closed transport path having portions A, B, C, D. Disposed along portion A of this path, as will also be described in greater detail hereinafter, is the mounting station 120, previously mentioned, at which the stockings are drawn onto forms 7, followed by a series of processing stations 121, 122 and 123 at portion B, a sorting station 125 at portion D, a storage facility 126 for sorted stockings, a dismounting station 127, 128 for removing the stockings from their forms, and a packing or wrapping station 129 wherein the stockings are packaged. An idler wheel 124 is carried on an arm 135 just beyond portion D and is biased by a spring 136 to take up the slack in the chain 6. The path portion C of the chain 6 represents the return run of the forms from the dismounting station 127 to the mounting station 120 and, while this path section is shown to be free of processing stations, it should be understood that a similar array of processing stations such as that occupying path portions A, B and D may be provided complementarily along path C so as to increase the capacity of the chain. The various stages will now be described with reference to FIGS. 1–13.

Figure 1:
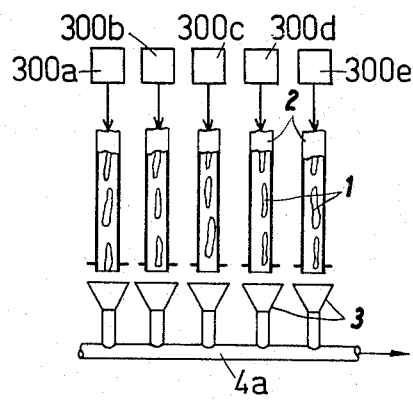
FIG. 1 is a diagrammatic view illustrating the initial stages of a hosiery plant according to the invention.

In FIG. 1 I show the initial stages of a system for the production of stockings and similar articles, adapted to be disposed upon shaping forms for further treatment, which includes an array of knitting machines 300a–300e (only five shown) whose tubular articles 1 are fed into chutes 2 of a pneumatic conveying apparatus. It should be noted that this portion of the hosiery plant is similar to that shown in FIG. 1 of my above-mentioned copending application No. 140,128 and, in accordance with the disclosure of this application, means may be provided for identifying the stockings produced by the machines 300a–300e in accordance with their gauge, mesh or size. Thus, the rough-shaped stockings or other knitted articles issuing from each machine may be labeled with preferably photoelectrically but conceivably also magnetically detectable information which is automatically scannable to indicate size and/or gauge. From chutes 2 the articles 1 fall into funnels 3 of a pneumatic transport line 4 (FIGS. 2 and 3), which terminates in a receptacle 5 at the mounting station 120.

The receptacle 5 may be a single collector for all of the articles or knittings 1 or, as disclosed in my copending application, may be representative of one of the chambers of a sorting device of the type shown in FIG. 5 of said earlier application. In the latter, the storage device is preceded by a pneumatic sorting means which intercepts the knittings produced by the machines and classifies them as to size and gauge, assigning all stockings of a particular size and gauge to a respective storage compartment. In the present application only one such compartment 5 is shown. The forms 7 are shown to be linked together at 207 to constitute the endless chain 6. Since the knittings may be hosiery, the forms 7 are shown leg-shaped with their toe portions extending upwardly. It should be noted that the knittings may be produced either as completed stockings (i.e. of the seamless type) by the machines 300a–300e or as partially completed articles which may be seamed by the usual sewing techniques, e.g. by a machine such as that shown in FIG. 1 of the copending application. Forms 7 are rigid with their base members 42a which are pivoted to an undercarriage 209 whose wheels 210 ride upon a track 211 while another pair of wheels 212 (better seen in FIG. 16) retain the forms on the track 211. Wheels 212 are rotatable about a vertical axis whereas wheels 210 rotate about horizontal axes. The mounting station 120 will be described in greater detail with reference to FIGS. 4–10.

*II. Pneumatic transport line (FIGS. 2–4)*

The pneumatic transport line 4 comprises an input end 4a (FIG. 1) provided with an array of funnels 3, only five of which are shown. The conduit 4 terminates in a sluice or gate 8 which passes the knitted articles 1 via a tube 13 to the receptacle 5 while providing suction in conduit 4. The latter advantageously has a large diameter to permit the unimpeded travel of the articles 4 therealong. Gate 8 comprises a casing 8' provided with a suction blower 14 whose blades 14' are driven by a motor 14" positioned in an aperture 14a in casing 8'. A grate 11 consists of a plurality of laterally spaced bars 11' extending downwardly and forwardly from the roof of conduit 4 in the direction of travel of articles 1 (indicated by the arrow X), thereby confining the articles to the lower compartment of conduit 4 below the grate 11.

Since the flow of air through the grate remains parallel to the direction of travel of the articles 1 (as indicated by arrow Y) there is no tendency for the articles to be held against the grate. A substantial portion of the air in the conduit thus passes through the upper compartment between the roof thereof and the partition 9 parallel to the direction of travel and adjoining the grate 11 at its lower extremity whereby this portion of the air passes out of the conduit through a grate 4" at its constricted outlet. Partition 9 is held in position by bolts 9'. The downwardly conically tapering grate 4" directs the articles 1 toward a funnel-shaped terminus 12 of tube 13 whose axis may be aligned with that of the conic section to which gate 4" conforms. The passage defined between grate 4" and the floor 4' of conduit 4 is, of course, sufficiently large to permit unrestricted passage of the articles 1, this floor being aligned with the floor of tube 13 so that there is little tendency for stockings to catch in the gap therebetween. The grate 4" is provided with openings having a total cross-section equal to about one quarter of the cross-section of conduit 4. Plate 9 is provided with perforations 10 in the region of this plate overlain by grate 4" and just rearwardly of the inlet 12 to tube 13. With this construction the articles 1 may be given sufficient momentum to pass below the perforations 10 and grate 4" into inlet 12 so that the air rising through these perforations and through this grate cannot carry the articles 1 upwardly. Suction fan 14 operates at such speed that only about 10% of the air passing through conduit 4 enters tube 13, the remaining air entering the plant. At the outlet end of tube 13 I provide a gate which may generally be of the type shown in FIG. 1 of the copending application or of the improved type shown in FIG. 4 whereby the articles 1 are deposited in receptacle 5. Receptacle 5 comprises a casing 5' to which access is afforded at an opening 5" in a wall of the casing facing an operator. The gate 15 within casing 5 comprises a housing 15' surrounding the outlet of tube 13 and forming therewith a Venturi nozzle 15" which draws the articles 1 from this tube into a conically diverging diffusor 17 to reduce the velocity of the air and slow the travel of articles 1. Air is supplied to housing 15' by a blower 16. A curved deflector 19 at the end of diffusor 17 deflects the articles 1 by way of bent fingers 20 onto a pile 19' which is supported on a shelf 18' carried by brackets 18 in casing 5'. The bent fingers 20 permit the air to pass vertically (arrow Z) without deflection while the momentum of the articles 1 carries them onto pile 19'.

*III. Mounting station (FIGS. 5–10)*

In FIG. 5 I show the mounting station 120, according to one embodiment of the invention, which is provided with a platform 21 vertically displaceable on guide columns 22 below the form chain 6, shown here in schematic representation. The operator 213 standing on platform 21 removes a stocking 1 from the pile 19' in receptacle 5 and, leaning to the right as seen in FIG. 5, draws it over the upper or toe portion of upright form 7 while the latter moves to the left, i.e. in the direction of arrow W. As will be described more fully hereinafter, the operator shifts his weight to the left while following the motion of form 7, thereby lowering platform 21 to enable him to draw the stocking easily over the lower portion of the form 7. The platform then rises and he leans again to the right preparatorily to drawing another stocking onto the next form.

Platform 21 comprises a rigid base 25' against which bears a metal bellows 23 connected to a source of hydraulic fluid via a line 38. An upper plate 21' of the platform is rigid with base 25' and extends over about half the upper surface of the platform. A vertically displaceable plate or treadle 24, which forms the remainder of the upper surface, is carried upon four carbon rheostats 25 supported by base 25'. The rheostats 25 are of the carbon-granule type and their resistance is lowered by compaction of the granules. As may be seen in FIG. 7, the rheostats 25 are connected in parallel across a source 30 of electromotive potential in series with a solenoid coil 27'. The latter is designed to operate a sliding-valve member 26 in a hydraulic valve housing 26' to control the supply of hydraulic fluid to the bellows 23. The platform 21 also carries the wiper 27a of a potentiometer 27 connected in series with a potential source 32 and a balancing solenoid 28 which also act upon valve member 26. Leaf springs 34a and 34b bear in opposite directions on respective ends 33a, 33b of valve member 26 to urge it into an intermediate position (shown in FIG. 7). Adjustable stop screws 35a and 35b limit the displacement of springs 34a, 34b.

A source of hydraulic fluid (not shown) is connected to the valve housing 26' via a tube 36 while a tube 37 returns from a valve to the fluid reservoir. An adjustable throttle 39 is disposed in line 37 for controlling the rate of flow of the fluid to the reservoir.

Figure 7:
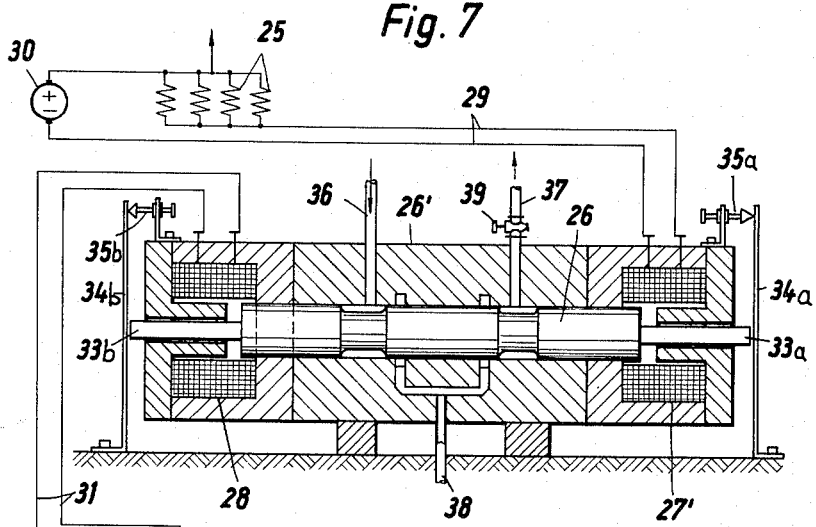
FIG. 7 is a diagram of the control system for this platform.

When, as shown in FIGS. 5–7, platform 21 is in its elevated position, and the operator 213 standing with his left leg on the rigid plate 21' and with his right leg on the movable plate 24 leans to the right, he puts substantially his full weight upon platform 24, thereby compressing the rheostats 25. In this position the operator is able to remove an article from pile 19' in receptacle 5 and commence drawing it over the toe portion of form 7 which moves in the direction of arrow W in the course of this process. Wiper 27a of potentiometer 27, carried by platform 21, has also reached its highest position. In this position the voltages across solenoid coils 27' and 28 are balanced and no net force is exerted upon the valve member 26 so that it is in its neutral position shown. As the form chain 6 continuously moves to the left, the weight of the operator shifts to his left leg (e.g. as shown by the dot-dash lines in FIG. 5). The pressure on carbon rheostats 25 is thus reduced and their resistance increased; the voltage across solenoid coil 27' is, thereby, reduced so that the valve member 26 is displaced to the left by effective solenoid 28. A fluid path is thus opened between conduit 38 and return conduit 37 via throttle 39 so that the platform 21 sinks as the hydraulic fluid within bellows 23 passes to the reservoir. It is clear, therefore, that platform 21 lowers in pace with the opertor's pulling of the article downwardly upon the form 7 so that the platform 21 is in its lower extreme position when the article has been completely positioned on the form; the operator thus avoids any bending motion. Throttle 39 controls the downward movement of the platform so that it moves at a convenient rate, i.e. 0.3 to 0.4 meter in 4 to 4½ seconds. When the platform 21 reaches its lower position, the resistances of rheostats 25 and potentiometer 27 are again about equal so that the valve member 26 is now again displaced into its neutral position by the springs 34a, 34b. Since the stocking is completely mounted, the operator again shifts his weight to the right, thereby decreasing the resistance of rheostats 25 and increasing the potential across solenoid 27' while the potential across solenoid 28 remains minimal. The valve member 26 is thus shifted to the right to admit fluid from line 36 into the bellows 23 and raise the platform. Platform 21 continues to rise until potentiometer 27 again balances resistors 25 so that the solenoids 27' and 28 are equally effective. The balancing occurs at the uppermost point in the travel of platform 21 since the operator has his entire weight on his right leg. The process previously described then may be repeated.

Figure 8:
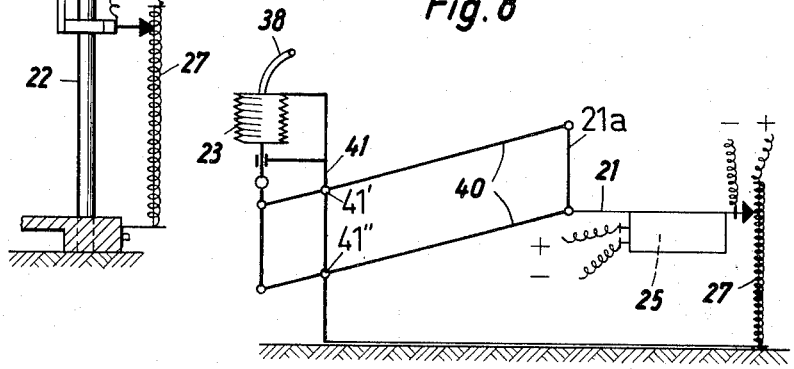
FIG. 8 is a diagrammatic view of a platform according to another embodiment of the invention.
Figure 17:
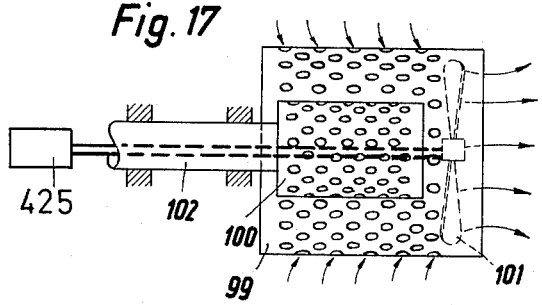
FIG. 17 is a front-elevational view, also taken transversely to the chain, showing the portion of the dismounting means for removing the stockings from their forms.

In FIG. 8 I show another embodiment of my invention wherein the guide columns 22 are dispensed with and the entire platform 21, including rheostats 25, is rigid with a bar 21a which constitutes part of a parallelogrammatic linkage 40 pivoted to a support 41 at 41', 41" and is raised and lowered by the bellows 23 which bear downwardly upon a distal portion of the parallelogrammatic linkage.

With the mounting means described with reference to FIGS. 5–8, the entire mounting of each stocking on its form had to be done by hand since it was necessary to fill out the entire stocking with the form if shape retention was important. This could only be done by highly skilled and rapid workers on account of the continuous movement of the forms. I have found that it is possible, with the aid of air jets, to accelerate the mounting process. This is accomplished by passing the forms through a mounting chamber with a small portion of their upper extremities extending from the chamber, the chamber being of a length along the path sufficient to accommodate several forms at once. Within the chamber I provide air jets which are directed downwardly and toward the form so that an operator is required only to draw a stocking over an initial portion of the form whence the air jets carry it downwardly on the forms, thereby completely filling out the stockings. Advantageously, the air jets are arrayed in vertically spaced rows on each side of the path. The spacing between the rows decreases at the lower portions of the forms since the latter increase in size in this region so that the resistance to drawing the stockings thereon increases. By decreasing the spacing between rows, it is possible to reinforce the strength of the jets at the bottom portion of the chamber and to overcome the increased resistance. The air passing through the jets preferably has a temperature of about 60° C., this temperature having been found to accelerate mounting substantially.

As may be seen in FIGS. 9 and 10, the transport path in the mounting station of chain 6 is flanked by a pair of manifolds $K_1$, $K_2$ which form between them a chamber K. The latter extends over along the transport path over a distance L' sufficient to accommodate a plurality of forms 7, 7', 7". Form bases 42, 42', 42" are joined as links in chain 6. While chamber K is shown to extend over three forms 7, it will be understood that it may also accommodate several more forms. Forms 7, 7', 7" extend above chamber K by a short distance h.

From manifolds $K_1$, $K_2$, vertically spaced horizontal arrays of jet nozzles 306', 306" extend into chamber K and are directed downwardly and inwardly toward form 7 on opposite sides thereof. The operator thus may withdraw a stocking 1 from a receptacle 205, which may be of the type previously described with reference to unit 5 of FIG. 4, and slips it onto the upwardly projecting toe portion of a form 7 momentarily disposed in front of him. The stocking is progressively propelled downwardly by the jets emanating from nozzles 306', 306" as the forms are continuously displaced through distance L' within the chamber K. This length is so chosen that the entire mounting operation will be completed before the form 7 exits from the chamber. As noted previously it is of advantage to reduce the vertical spacing of the arrays toward the enlarged bottom portions of forms 7 so as to overcome the increased resistance to mounting a stocking deriving therefrom. While generally the air is supplied to the jets continuously, it has been found on occasion that better results may be obtained by interrupted jets generated with the aid of a pulsator-type compressor. Particularly effective results are obtained when the jets are formed by applying suction to the chamber K in addition to or in place of supplying air under pressure to the manifolds. Since, as mentioned above, heated air is generally used, it will be understood that heating efficiency may be increased by recirculating as much of the air as possible.

FIG. 10 shows that a previous form 7' of a chain displaced in the direction of arrow P has its stocking propelled nearly halfway down the form after traversing about half of the chamber while a form 7" about to leave the chamber K has its stocking completely positioned thereon. Manifolds $K_1$, $K_2$ are supplied by blowers $V_2$, $V_1$ respectively, from a collecting chamber G connected to the mounting chamber K. The blowers simultaneously apply suction to this chamber and pressure to the nozzles so that high-velocity jets are obtained. Heaters 307' and 307" are disposed in the air lines to raise the air to a temperature of 60° C.

IV. Processing station (FIG. 12)

Figure 28:
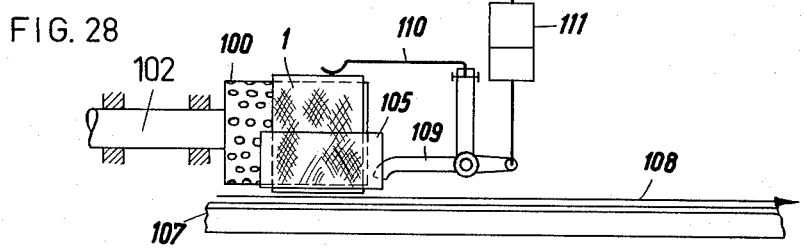

The processing station 121–123 (path portion B) advantageously comprises a sequence of stages, such as disclosed with reference to FIG. 28 in my copending application, through which the forms 7 are continuously led. The forms 7, carrying the rough-shaped articles 1, are displaced through a bath 43 of saturated steam, wherein the stockings are preheated and moistened, and thence to a cleaning and rinsing chamber 44 wherein the stockings are sprayed with hot water. From the washing and rinsing chamber 44, the stockings pass on their forms into a primary fixing chamber 45 in which they are exposed to a stream of superheated steam at a temperature of about 185° C. The polymeric threads of the stockings are, as a result of the exposure to hot steam, at least partially cured and thus retain the shape of the form 7 upon which they are carried. The drop in temperature of the steam as it traverses the fixing or setting chamber 45 may be about 20° C. from inlet to outlet for best results.

The stockings 1, still carried by forms 7, are then displaced through respective coloring chambers (e.g as described with reference to FIG. 6 of the above-mentioned copending application) represented by chamber 46. The dyeing chamber will be described in greater detail with reference to FIG. 16. In chamber 46, which is maintained at a temperature of about 100° C., a dyeing liquid circulated by a pump 52 is sprayed onto the stockings 1. The dye-spraying system is also provided with a pump 53 adapted to add further dyestuff as well as softened water to the circulating liquid. The dyed stockings 1 then pass through a rinsing chamber 48, in which excess dye is removed therefrom by a water spray, and a glazing or hardening chamber 49 wherein a sizing or hardener solution is applied to the fabric. From chamber 49, the stockings are carried on their forms into an aftercuring or setting chamber 50 in which they are again exposed to superheated steam, this time at a temperature of about 150° C., in order to complete the shaping process. The stockings then pass into a drying chamber 51 in which they are dried at an ambient temperature of about 110° C.

The successive chambers 43–46 and 48–51 constitute a plasticizing or plastifying apparatus through which the stockings 1, carried upon their forms 7, can be drawn continuously so as to be fully treated after a period of about 11.33 minutes. Optimally, the stockings should be exposed to saturated steam in chamber 43 for a period of about 50 seconds, washed and rinsed in chamber 44 for about 50 seconds, exposed to superheated steam in chamber 45 for about 150 seconds and sprayed with dyeing liquid in chamber 46 for about 180 seconds. Rinsing in chamber 48 should be carried out for about 50 seconds whereas the stockings should remain in the finishing chamber 49 for a period of about 50 seconds; the final forming steps (chambers 50 and 51) can be accomplished in approximately 150 seconds.

The stockings and their forms 7 are discharged from the plasticizing apparatus and passed through an inspection chamber 54 wherein they are optically checked for defects. The stockings then may be led on their forms to the dismounting station, represented by the reference numeral 55 in FIG. 12.

V. Form chain (FIGS. 11, 13–15 and 35)

In copending application Ser. No. 140,128 and, more particularly, with reference to FIGS. 19–26 thereof, I disclose means for producing compact groups of forms for passage through the treatment stages. While the forms displaced along their closed path lie in planes parallel or nearly parallel to the path for ease in mounting and dismounting the stockings, it has been found that, for efficient treatment, within chambers of reasonable length, it is desirable that the forms passing through the processing station be oriented with close mutual spacing in planes transverse to the direction of travel at the inlet to the processing station and reoriented upon exit therefrom into planes lying in the direction of travel. In this copending application individual forms are pivoted through an angle of 90° by cams and a plurality of forms provided on a common carrier are simultaneously so pivoted by means of a lazytongs arrangement. The mechanisms shown in the copending application, however, are not applicable to an endless chain of interlinked forms.

In FIGS. 11 and 13–15 I show an endless chain 6 (only schematically represented in FIGS. 11 and 35) of forms 7 whose supports or bases 42 constitute links of the chain. A forward portion of each base 42 is articulated to a link clip 56 at a pivot 56' for swinging movement about the vertical pivotal axes, which extend perpendicularly to the transport path, relative to the clip 56. Each clip 56 is also articulated to the base 42 of a respective forwardly positioned form 7 at a rear portion thereof for similar swinging movement relative thereto about the axis of a pivot 56". While the bases 42 of forms 7 are preferably rigid therewith and are carried by rollers 58 rotatable about horizontal axes and spaced along the transport path (FIG. 14), it should be understood that the operations to be described hereinafter are also applicable to forms whose base members 42a are pivoted to undercarriages 209 for rotation about vertical axes. The undercarriages should extend along the track 211 (FIG. 1) only sufficiently to support the forms adequately without preventing the lateral juxtaposition of the linked bases.

As shown in FIG. 35, and described above, the entire chain 6 may be driven by a motor 130 via a worm 131 and a worm wheel 132. Nevertheless, I prefer to provide drive means at the inlet to the processing station for positively feeding the links of the chain to the folding means which form a compact group therefrom and advance the group of forms through the processing station. The drive means (FIG. 13) includes two pairs 59, 59' of friction rollers frictionally engageable with the flanks of the bases 42 of the forms 7 on opposite sides thereof. The pairs of drive rollers, which feed the forms 7 confined between a pair of guide rails 57 extending in the direction of form travel, are spaced along the transport path by a distance taken between their axes equal to the product $N \times R$ where N is an integer (preferably unity) and R is a distance greater than the total length of one of the bases 42 or 42a, serving as a chain link, and a clip member 56 or 207 (FIG. 1), articulated thereto, but less than twice this length. Advantaegously the aforementioned product is equal to 1.5 times the length so that at least one pair of drive rollers always grips the longitudinal edges or flanks of a base 42, 42a. Thus, when a link member 56 or 207 is aligned with the rollers of one pair, the rollers of the other pair will be frictionally engaged with the base of a form 7 so that continuous tension is applied to the chain. The bases 42, 42a are provided with outwardly converging tooth-shaped trailing and leading extremities 142, 142'.

The drive rollers 59, 59' feed the linked form 7 into a folding mechanism whereby several hundred forms may be displaced into planes transverse to their transport path and advanced as a compact group to which further forms are continuously added while others are continuously withdrawn from the group at the outlet end of the processing station after the completion of the treatment of the articles carried thereon. From FIG. 13 it may be seen that a pair of detents 61, 62, in the form of spring-loaded fingers, hold the last base 42 of a form 7 not otherwise illustrated in this figure against the previously formed compact group thereof. A succeeding base 42b is advanced by the drive rollers 59, 59' past a spring-loaded guide pawl 60 swingably mounted on one guide rail 57 and biased toward the chain 6 while being restrained by a stop 60'. The base 42b swings about its forward clip 56 and is partially confined by a guide member 59" which diverges from the tip 60" of guide pawl 60 at the entrance end of the region B (FIG. 11), defining the location of a treatment station, and is secured to the other rail 57. Switch means, schematically represented by a sensing switch 63 biased into contact with the connecting clips 56 by a spring 63' as the clips sweep past the switch, initiate operation of a single-revolution motor 64. The switch means may also include photoelectric or magnetic sensing means responsive to a message provided on the flank of each form 7 as disclosed in my copending application.

A crank 65 coupled with motor 64 displaces an arm 67' about its axis of rotation whereby a pawl 67, pivoted to this arm, steps a ratchet 66 rotatable about this axis. A gear 68, rigid with ratchet 66, meshes with the tooth-shaped trailing extremities 142 of the compact array of form bases 42 which constitute a rack and displace the entire group by a distance along the transport path equal substantially to the width of one base. Another gear 68', identical with gear 68 and coupled therewith via a transmission 69, meshes with the rack formed by the tooth-shaped opposite ends or leading extremities 142' of bases 42. The detents 61 and 62 bear upon the rearward lateral face of the newly added base 42 and are thus out of the path of gears 68, 68'. Stops 61' and 62' serve to engage arms 61" and 62" of detents 61, 62, thereby preventing excessive angular displacement thereof.

As each oncoming link base 42 is swung into the position shown at 42b in FIG. 13, guide pawl 60 is cammed away from the transport path by the former base against the force of its spring so that the arcuate tip 60" of this pawl bears against the detent 62 to withdraw same temporarily from its operative position in which it bears upon the lateral face of the previously oriented base 42c. The latter is, meanwhile, advanced by gears 68, 68'. The oncoming base 42b is thus able to slip into position in a plane transverse to the transport path, whereupon pawl 60 is relieved and detent 62 returned by its spring to its operative position wherein it will bear upon the newly positioned base. At the rate at which the form-chain links are added to the group at the inlet end of the processing station, the links at the outlet or exit end are drawn past spring-loaded retaining fingers 71, 72 between converging portions of guide rails 57a by frictional drive rollers 59a, similar to those illustrated at 59, 59', only one pair of which are shown. Advantageously, the guide channel 70a formed between rails 57a at the reorientation end of the compact form package is aligned with the pivots 56', 56" of the transversely oriented forms at one side of the guide path while the corresponding channel 70 between rails 57 at the inlet end is aligned with the pivots of the form at the opposite side of the path. Finger 71 is shorter than finger 72 and is disposed along channel 70a so that forms being reoriented to lie in planes parallel to the transport path overcome the force of its compression spring while finger 72 still bears upon the package. So that the form bases 42 are arrayed in laterally abutting relationship within the package, the chain members are dimensioned in such manner that the length L of the clips 56, 207, the distance T between pivots 56' and 56" of each base and the distance t between the corresponding pivots of a pair of successive laterally abutting bases are in substantially the relationship $L^2 = t^2 + T^2$ (see FIG. 15).

*VI. Dyeing stage (FIG. 16)*

In FIG. 16 I show the dyeing stage of a processing station, according to the invention, which may, of course, replace the dyeing stage shown at 46 in FIG. 12. An elongated dyeing chamber 171, extending along the transport path and enclosing a portion of same through which the transversely oriented forms 7 are displaced in closely spaced relationship (i.e. with their bases abutting laterally as described with reference to FIGS. 13–15), is formed by two side walls 172, 173 parallel to the transport path. Below chamber 171 there is provided a trough 75 extending the full length of chamber 171 and serving as collector means for the dye liquid 76. The roof 74 of the chamber is formed with spray heads 77 which are fed by a supply line 78. The heads 77 may be spaced along the transport path while extending transversely thereacross parallel to the planes of forms 7 carrying undyed stocking blanks 1 (FIG. 1). Supply line 78 receives dye liquid from a pump 80 driven by a motor 79 and drawing the liquid from the reservoir trough 75. Interposed between the pump 80 and the spray heads 77 in line 78 is a filtering device 81 whose conical filter 82 converges in the direction of liquid flow and is provided at its apex with a waste pipe 83. The latter abstracts the particles picked up by filter 82 in the form of a sludge, delivering it to a waste receptacle 83'. The clarified liquid passing through the filter 82 is conveyed to the spray heads 77 by supply line 78 via an infuser 84 through which a heating fluid may be added to the dye liquid. Infuser 84 is connected to a steam line 86 by way of an electromagnetic valve 85 controlled by a thermostat 87 whose temperature-responsive element 87' extends into supply line 78. The temperature of the dye liquid may thus be maintained substantially constant (e.g. at about 100° C.).

The supply line 78 is tapped at 89 by a branch tube 90 which shunts a portion of the dye liquid past the heads 77 for analysis as to dye concentration. The colorometric analysis device 88 is disposed along a translucent section 91 of branch line 90 and is sensitive to changes in the optical density of the dye liquid. The device 88 comprises a light source 92 disposed on one side of translucent section 91 in a casing 88' and photoelectric detector means disposed on the other side thereof to receive light rays passing through section 91 and the dye liquid flowing therethrough. The photoelectric detector means may comprise a photoelectric cell adapted to produce an output or, as indicated in FIG. 16, a photoconductor 93 connected in series with a power source shown as a battery 88''. The terminals 93' of this series combination are connected via leads 94 to an electrical comparometer 95 adapted to produce a signal actuating an electromagnetic valve 96 to admit dye concentrate from a container 97 into the trough 75 upon the dye level in liquid 76 falling below a predetermined level. It will be apparent that such fall in the concentration of dye in liquid 76 will result in an increase in the intensity of illumination received by the photoconductor 93 and a consequent decrease in its resistance; the potential appearing at terminals 93' will thus increase. The comparometer 95 may comprise a resistance bridge of the usual type, across one resistor of which terminals 93' are connected. A reference potential may be applied to another resistance of the bridge by an adjustable voltage divider 95'' bridged across a battery 95'. When bridge is unbalanced sufficiently, owing to an increase in the potential at terminals 93', a current flows in a bridge diagonal to actuate valve 96. The latter may be biased to close automatically upon the rebalancing of the bridge or the comparometer may be designed to produce an impulse indicative of the restoration of a balanced condition to close the valve. Alternatively, the reference potential may be derived from analysis of a standard dye liquid. The latter, in a transparent tube 91a, is transluminated by a light source 92a whose rays are receved by a photoconductor 93a in series with a battery 88a'' connected across the reference terminals of the comparometer bridge. Replacement of the tube 91a will thus automatically reset the control system for a new dyestuff. The quantity of dye continuously circulated is maintained constant by an overflow 98. The entire quantity of dye liquid should be circulated about 150 times in one hour. Should the agitation resulting from this high rate of circulation be insufficient to mix the dye concentrate added by valve 96 into the contents of the trough, an agitator 75' may be provided.

*VII. Dismounting and wrapping stations*
*(FIGS. 17–33, 33A and 33B)*

Figure 33A:
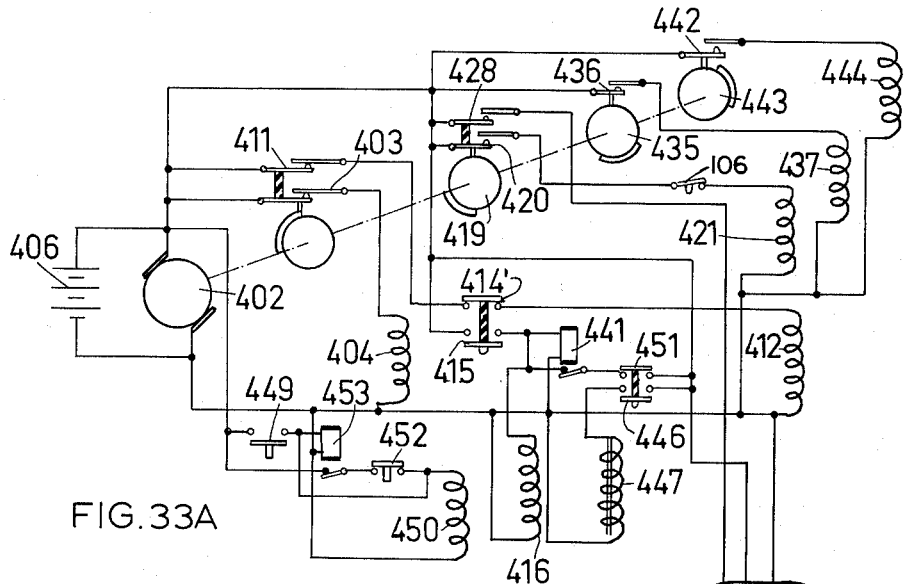
FIG. 33A is a circuit diagram of this assembly.
Figure 33B:
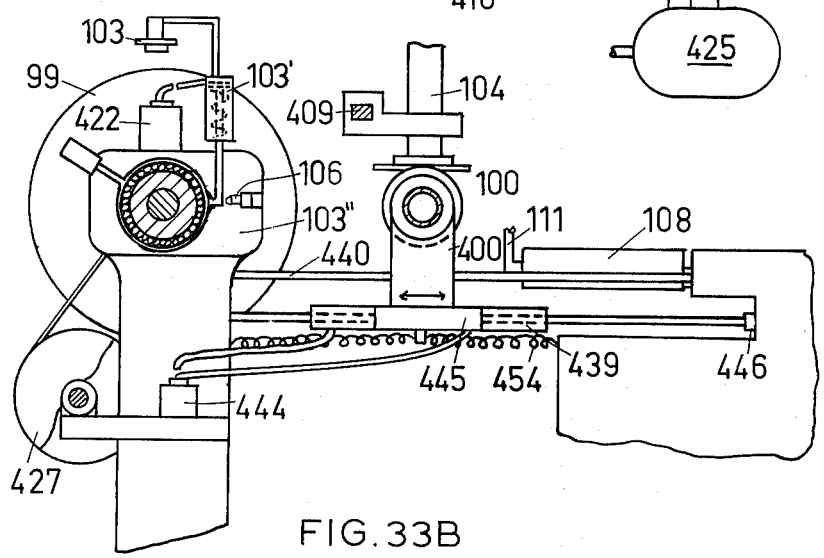
FIG. 33B is a cross sectional view taken along line XXXIIIB—XXXIIIB of FIG. 33.

The dismounting and wrapping stations disposed along the transport path basically comprise a first or stripper drum 99, a further or take-up drum 100 for removing a stocking from drum 99, and means 109 etc. for drawing the stocking from drum 100 and disposing it upon a moving conveyor. The first drum 99 is rotatable about a fixed axis parallel to the transport path and to the planes of forms 7 displaceable therepast. A gripper member 103 is carried by a pneumatic cylinder 103' adapted to displace the gripper member radially with respect to the axis of perforated drum 99, the cylinder 103' being swingable about this axis on a bushing 103''. The take-up drum 100 is also perforated and has an axis of rotation extending parallel to that of drum 99 but is shiftable on a carriage 400 between one extreme position wherein the take-up drum 100 osculates drum 99 and a second extreme position wherein it is remote from the latter and disposed over a continuous conveyor band 108. Intermediate these positions a feed means 104 is adapted to position a flexible sheet on drum 100 in such manner that it extends axially beyond the edge of this drum. The stocking 1 is carried on this sheet and, when drum 100 is disposed in its second position, a stripper finger 109 clamps the extending marginal portion of the sheet against the conveyor band 108 whereby the stocking and this sheet are drawn from the drum onto the latter, the entire operation being programmed by a central control system 401 (FIGS. 33 and 33A).

Figure 18:
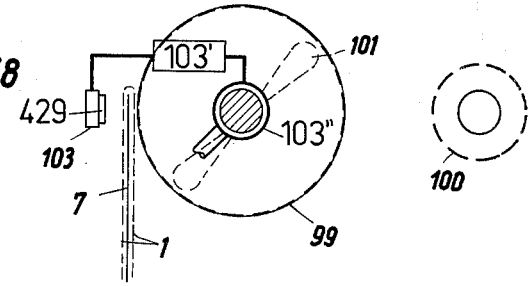
FIGS. 18–27 are schematic end views of the dismounting means in successive operative positions thereof.
Figure 19:
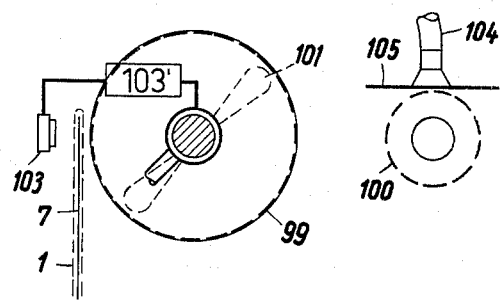

With drums 99 and 100 in the relative positions shown in FIG. 18, programmer motor 402 rotates the drum switches of system 401 (shown as cam-operated sequence switches in FIG. 33A for convenience) to close a switch 403 which energizes the solenoid 404 of an electromagnetic valve 405 (FIG. 33) by way of a battery 406 to admit air into a pneumatic cylinder 407. The piston of this cylinder is displaced to the left (FIG. 33) and carries therealong a slide 408 which is horizontally shiftable parallel to the transport path on a rail 409 of a frame 410. Simultaneously, a switch 411 has been closed to energize a solenoid 412 which controls a butterfly valve 413 in a suction line 414 communicating with the suction cup 104' of a feeding device 104. A sheet 105 of flexible material (e.g. paper or cardboard) is thus lifted by the suction cup 104' and displaced together with slide 408 into a position wherein the flexible sheet 105 is disposed above drum 100 (FIG. 19).

Figure 20:
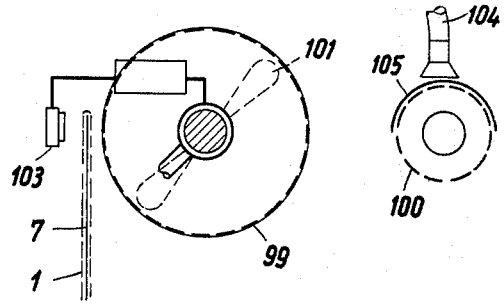

Upon reaching this position, the slide 408 contacts a normally closed limit switch 414' in series with solenoid 412 to de-energize the latter and close valve 413, thereby releasing the sheet 105 from feed means 104. The limit switch also includes a normally open switch 415 which closes simultaneously with the release of sheet 105 to energize the solenoid 416 of another butterfly valve 417 in a suction line 418 communicating with the hollow shaft 102 of perforated drum 100. Valve 417 thus opens and the resulting vacuum at drum 100 draws the sheet 105 around the latter (FIG. 20). Continued operation of timer motor 402 has meanwhile opened switch 403 to de-energize solenoid 404 and permit a spring 418' within cylinder 407 to return the slide 408 to its initial position above the paper stack 105'. The sheet 105 extends only over the upper half of the periphery of drum 100.

Figure 21:
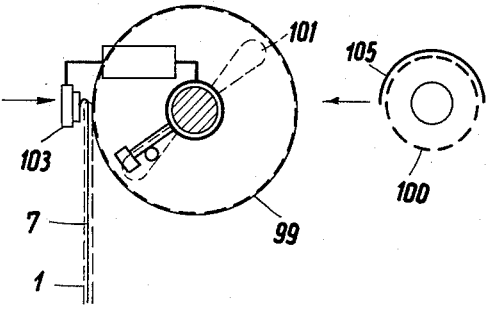

Another cam 419 driven by motor 402 then closes a switch 420 in series with the solenoid 421 of a valve 422 which supplies air under pressure from a distributor 423 to pneumatic cylinder 103'. Gripper member 103 is thus displaced radially toward the drum 99 while in its horizontal position to clamp a stocking 1 on a form 7, disposed between the gripper member and the drum 99 substantially tangential to the latter, against the drum (FIG. 21). Drum 99 is rotated by motor 402 via a transmission 424. A suction fan 101 within the drum is driven by a two-speed motor 425 via a pair of belt-and-pulley transmissions 426, 427. Simultaneously with the actuation of solenoid 421 a switch 428 is closed to shift the motor 425 from its low speed into high speed, thereby increasing the suction along the surface of the drum 99 to hold the stocking firmly thereagainst. The counterclockwise swing of gripper member 103, which is preferably formed with a cushioned gripper surface 429 to prevent marring of the stocking, is limited by a stop 430 while another stop 431 serves to limit clockwise rotation so that the angular displacement of the gripper member is only about 90°. The stocking 1 is drawn by suction so tightly and uniformly against the periphery of drum 99 that it lies thereagainst substantially free of wrinkles.

Figure 22:
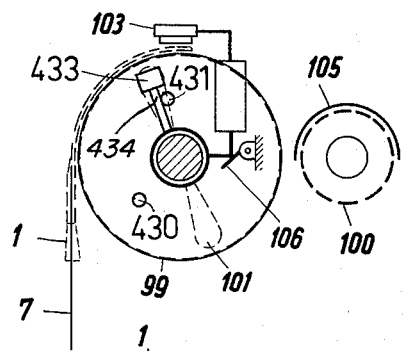
Figure 23:
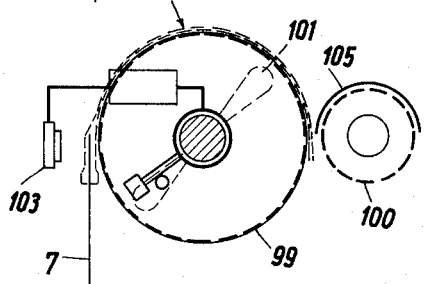
Figure 24:
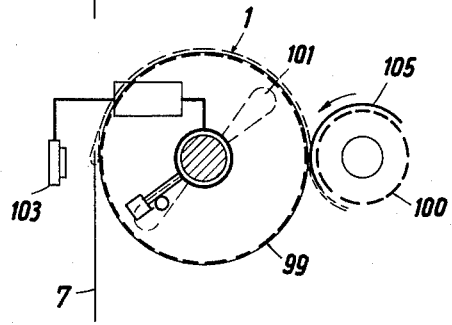
Figure 25:
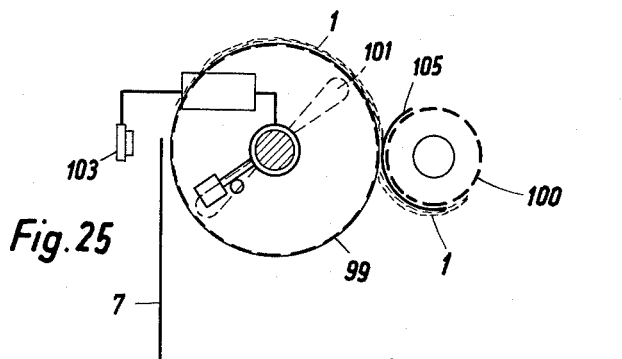
Figure 26:
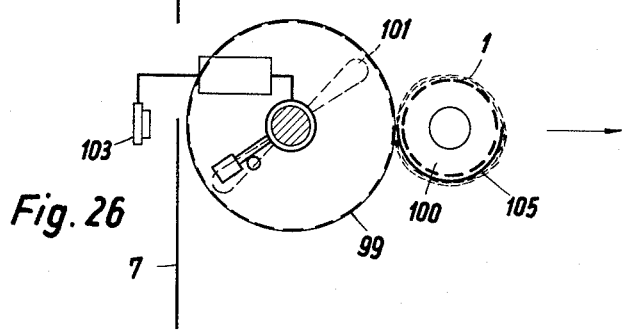

As illustrated in FIG. 22, the gripper member 103, bearing against the periphery of drum 99, is entrained therewith in clockwise direction until it engages a normally closed limit switch 106 in series with solenoid 421 which opens the latter so that a spring 432 within cylinder 103' displaces the gripper member radially outwardly to release it from entrainment with drum 99. The gripper member 103 also reaches its clockwise limit of rotation and a weight 433 carried by an arm 434 rigid with bushing 103'' swings the gripper member back to its initial position (FIG. 23).

Figure 27:
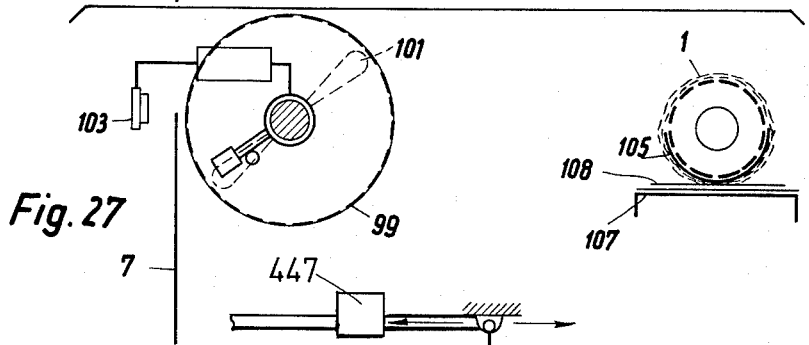

Continued rotation of timer motor 402 has earlier displaced a cam 435 sufficiently to close a switch 436 and energize the solenoid 437 of another electromagnetic valve 438 so that this valve feeds air under pressure to a cylinder 439 which displaces the carriage 400 on rails 440. Carriage 400 has thus brought the take-up drum 100 toward drum 99 into a position wherein the drums are substantially osculating. In this position, the stocking 1 on drum 99 lies just below the left-hand edge of sheet 105 (FIG. 23). Meanwhile, switch 428 has opened so that the suction fan 101 of drum 99 again operates at low speed whereas a holding relay 441 has kept valve 417 open and has maintained a resulting high degree of suction in drum 100. The stocking is, therefore, drawn across to drum 100 which is rotated by the driven drum 99. When the stocking 1 lies entirely upon drum 100, switch 436 opens and another switch 442 is closed by a cam 443 to energize a valve 444 which feds a pneumatic cylinder 445 and displace the carriage 400 away from drum 99 to a position wherein it is disposed above a wrapping table 107 which carries a continuous band 108 of transparent packaging material (FIG. 27).

When carriage 400 is disposed above the band, it closes a limit switch 446 to energize a solenoid 447 (FIG. 28), thereby drawing a stripper assembly 111 to the left along table 107 against a combined tension and compression spring 448 tending to maintain the assembly in its position shown in FIG. 31. The assembly, upon its displacement to the left (FIG. 28), trips a limit switch 449 whereby a valve 450 is opened to displace the lever 109 and clamp the axially extending marginal strip of sheet 105 against the band 408 (FIG. 29). This marginal strip projects about 1 cm. beyond the edge of drum 100. A resilient finger 110 connected to lever 109 engages the article on the upper surface of drum 100. The suction in the latter has been cut off owing to the opening of normally closed switch 451 simultaneously with the operation of limit switch 446. The article removed from drum 100 is folded double about the flexible sheet 105 and is disposed flat upon band 108 as the latter moves to the right (FIG. 30), entraining therewith the assembly 111. A normally closed limit switch 452 is then actuated by the assembly to de-energize the holding circuit 453 of valve 450 and release lever 109 which returns by the action of spring 448 to its initial position (FIG. 31). Carriage 400 is likewise restored to its intermediate position upon inactivation of switch 442 by a spring 454. The packaging of the stockings may then be completed as described with reference to FIG. 9 of my previously mentioned copending application. Thus, the stockings carried by band 108 are sandwiched between the latter and another transparent foil (both may be polyethylene); the two foils may then be heat-sealed together along their longitudinal edges by suitable rollers. A cutter, not here shown but fully disclosed in the copending application, severs each pair of packaged stockings from the continuous wrapper 108 etc. The stockings are thus enveloped in transparent sleeves open at each end and may be inserted into boxes in the usual manner.

Figure 34:
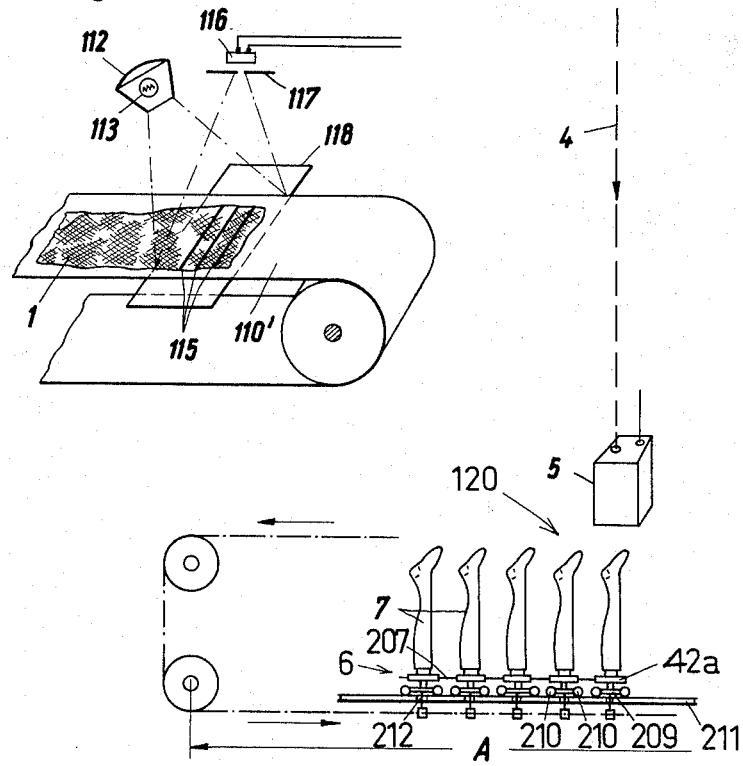
FIG. 34 is a perspective detail view of a photoelectric scanning device employed in the plant.
Figure 2:
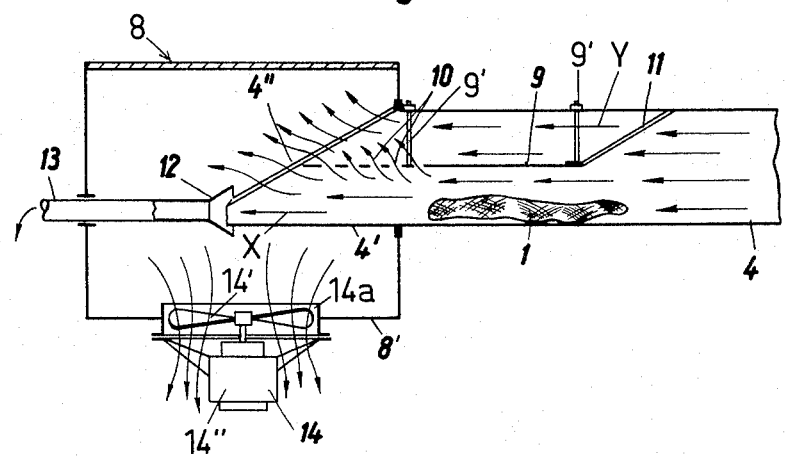
FIG. 2 is a detail view of FIG. 1 showing in axial cross-section a pneumatic gate for propelling knitted articles.
Figure 3:
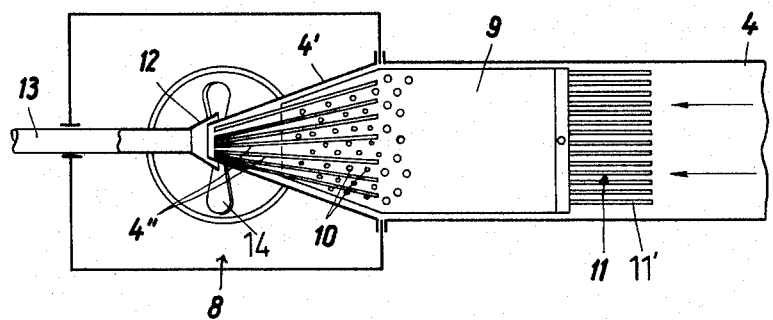
FIG. 3 is a plan view of the gate, partly in axial section.

VIII. Indicia-sensing means (FIG. 34)

As disclosed in my copending application, the stockings 1 may be provided with optically scannable indicia indicative of characteristics of the finished stockings. In FIG. 34 I show a light source 113, which is provided with a reflector 112, illuminating a stocking 1 passing therebeneath upon a transparent conveyor belt 110'. The stocking is provided with information strips 115, as fully disclosed with reference to FIG. 16 of the copending application, along the thigh portion of the stocking. The light reflected by strips 115 are received by a photocell 116 having a diaphragm 117. A reflecting plate 118 of contrasting background is disposed beneath the conveyor 100' which may be a strip of a synthetic resin. Changes in the output of photocell 116 engendered by the strips 115 may be employed for effecting processing controls with the aid of control devices well known per se.

The invention as described and illustrated is believed to admit of many modifications and variations within the ability of persons skilled in the art, all such modifications and variations being considered within the spirit and scope of the appended claims.

I claim:
1. A system for processing flattenable tubular articles, comprising a treatment station; an endless conveyor for transporting a succession of flat forms with articles supported thereon past said treatment station, said conveyor including interleaved elongated bases and links articulated to one another, said bases having longitudinal edges extending between leading and trailing extremities thereof engaged by said links; an article-supporting form rising from each of said bases, the latter being pivotable between first positions substantially in line with the direction of conveyor movement and second positions substantially transverse to said direction, the leading and trailing extremities of adjacent bases being respectively juxtaposed in said second positions thereof; first guide means engageable with said longitudinal edges of said bases at locations remote from said station for maintaining said bases in said first positions; second guide means in the region of said station engageable with said juxtaposed extremities of said bases in said second positions thereof for maintaining said bases parallel to one another in said region; mechanism including said first and second guide means for advancing said conveyor along a closed path through said station; first control means at the entrance end of said region for successively swinging said bases from said first positions into said second positions; and second control means at the exit end of said region for successively swinging said bases from said second positions into said first positions.

2. A system as defined in claim 1 wherein said second guide means comprises a pair of gears on opposite sides of said conveyor, said gears having teeth fitting into spaces formed between said juxtaposed extremities.

3. A system as defined in claim 2 wherein said mechanism includes drive means for rotating said gears in unison.

4. A system as defined in claim 3 wherein said drive means comprises a ratchet positively coupled with one of said gears and pawl means reciprocable to advance said ratchet.

5. A system as defined in claim 3, further comprising sensing means disposed alongside said conveyor at a check point ahead of said entrance end for imparting limited rotation to said gears upon movement of any of said bases past said check point.

6. A system as defined in claim 1 wherein said first guide means comprises a pair of rails forming a channel for said bases outside said station, said first control means including a pair of diverging formations extending beyond said rails toward said entrance end.

7. A system as defined in claim 6 wherein said first control means further comprises resilient detent means successively engageable with said bases at said entrance end just beyond said formations.

8. A system as defined in clam 7 wherein one of said formations is provided with resilient biasing means urging it against the other of said formations.

9. A system as defined in claim 6 wherein said second control means comprises spring-loaded retaining means engageable with the extremities of successive bases at said exit end and a pair of converging formations beyond said retaining means for directing said bases into said channel.

10. A system as defined in claim 6 wherein said first guide means comprise pairs of drive rollers spacedly positioned along said rails on opposite sides of said channel.

References Cited by the Examiner
UNITED STATES PATENTS

| | | | |
|---|---|---|---|
| 265,129 | 9/1882 | Needham | 187—17 |
| 2,429,458 | 10/1947 | Grothey et al. | 66—1 |
| 3,430,668 | 11/1947 | Chamberlin | 68—12 |
| 2,574,970 | 11/1951 | Heldmaier | 223—76 |
| 2,646,194 | 7/1953 | Berger | 223—76 |
| 2,786,674 | 3/1957 | Heijnis | 226—181 X |
| 2,838,217 | 6/1958 | Bowman et al. | 223—76 X |
| 2,990,088 | 6/1961 | Isken et al. | 223—76 |
| 3,016,973 | 1/1962 | Williamson | 187—9 |
| 3,022,926 | 2/1962 | Bailey | 68—5.3 |
| 3,054,542 | 9/1962 | Glaze | 223—112 |
| 3,103,302 | 9/1963 | Minton | 223—39 |

FOREIGN PATENTS

| | | |
|---|---|---|
| 1,099,520 | 3/1955 | France. |
| 1,166,743 | 6/1958 | France. |

JORDAN FRANKLIN, *Primary Examiner.*

RUSSELL C. MADER, *Examiner.*